(12) United States Patent
Mangiapane

(10) Patent No.: US 6,360,650 B1
(45) Date of Patent: Mar. 26, 2002

(54) MULTIPLE BEVERAGE PREPARATION DEVICE

(76) Inventor: Joseph Mangiapane, 224 Grassmere Ave., Oakdale, NY (US) 11769

( * ) Notice: Subject to any disclaimer, the term of this patent is extended or adjusted under 35 U.S.C. 154(b) by 0 days.

(21) Appl. No.: 09/609,744

(22) Filed: Jul. 3, 2000

(51) Int. Cl.[7] ................................................ A41J 31/00
(52) U.S. Cl. .......................... 99/291; 99/280; 99/284; 99/289 P; 99/307
(58) Field of Search ...................... 99/291, 298, 289 P, 99/306, 304, 307, 284, 279, 295, 316, 280

(56) References Cited

U.S. PATENT DOCUMENTS

| | | | | |
|---|---|---|---|---|
| 4,421,014 A | * | 12/1983 | Vicker | ...................... 99/289 P |
| 4,944,217 A | * | 7/1990 | Watanabe | .................. 99/295 X |
| 5,134,924 A | * | 8/1992 | Vicker | ....................... 99/295 X |
| 5,490,447 A | * | 2/1996 | Giuliano | ................ 99/289 P X |

* cited by examiner

Primary Examiner—Reginald L. Alexander

(57) ABSTRACT

The invention relates to a device for the preparation of multiple beverages. The device comprises a housing containing a primary reservoir for holding a liquid that is used to make a beverage. Disposed within the housing is a rotatable tray. The rotatable tray contains a plurality of receptacles. These receptacles are for receiving a concentrate solution for flavoring the liquid. In addition, disposed within the housing is a conduit for transporting the liquid from the reservoir to the rotatable tray. In this case the conduit allows the reservoir to be in fluid connection with the tray.

14 Claims, 3 Drawing Sheets

MULTIPLE BEVERAGE PREPARATION DEVICE

BACKGROUND OF THE INVENTION

Field of the Invention

The invention relates to a multiple beverage preparation device that is designed to dispense multiple different types of beverages from a single magazine tray.

SUMMARY OF THE INVENTION

The invention relates to a device for the preparation of multiple beverages. The device comprises a housing containing a primary reservoir for holding a liquid that is used to make a beverage. Disposed within the housing is a rotatable tray. The rotatable tray contains a plurality of receptacles. These receptacles are for receiving a concentrate solution used for flavoring the liquid. In addition, disposed within the housing is a conduit for transporting the liquid from the reservoir to the rotatable tray. In this case, the conduit allows the reservoir to be in fluid connection with the tray.

In addition, disposed within this tray is a heater for heating the liquid within the housing. This allows the device to make hot beverages after the liquid has been poured into the reservoir. There is also least one additional reservoir disposed within the housing adjacent to the primary reservoir. This additional reservoir is designed to receive liquid or preferably water from the primary reservoir and measure the amount of liquid using a liquid position sensor disposed within the additional reservoir. For example when the liquid is below the liquid position sensor within the additional housing, a valve connecting the primary reservoir to the additional reservoir is open, allowing liquid to flow from the primary reservoir to the additional reservoir. However, when liquid reaches or surpasses the liquid position sensor within the additional housing, the valve is closed, stopping the flow of liquid from the primary reservoir to the additional reservoir.

There is also a pump disposed within the housing for pumping the liquid from the additional reservoir through the conduit and into the rotatable tray. This pump pulls liquid from the additional housing and pushes it through the conduit into the tray so that this liquid contacts the concentrate disposed within the receptacle to create the desired beverage. The concentrate is loaded into each receptacle using a reusable filter that is designed to receive a concentrated solution for flavoring. Thus a user can take this reusable filter and insert any type of concentrated solution such as caffeinated or decaffeinated coffee grounds, hot chocolate powder, a tea bag, or any other form of concentrate solution designed to make a flavored beverage.

The housing also contains a spout adjacent to the rotatable tray wherein this spout is designed to funnel the liquid into a stream after said liquid has left the rotatable tray. This stream then pours into a cup or pot to store the flavored beverage. The housing also contains a drainage tray designed to receive excess beverage so that if the flavored beverages overflows the cup or pot, the beverage simply flows into the drainage tray.

The rotatable tray also contains a series of label plates so that there is at least one label plate disposed adjacent to each of the receptacles. In this way, a user can write on a label plate adjacent to a particular receptacle so that the user knows the type of concentrated solution disposed within each receptacle.

The housing also includes a spring loaded protrusion. This spring loaded protrusion fixes the rotatable tray within the housing so that the spring loaded protrusion allows the tray to rotate about this spring loaded protrusion.

Correspondingly, the rotatable tray contains a detent disposed in a center region. This detent is designed to receive the spring loaded protrusion and mate with the spring loaded protrusion so that the rotatable tray is substantially fixed within the housing. This rotatable tray also contains a series of locking detents disposed adjacent to the receptacles wherein these locking detents are designed to periodically lock the rotatable tray in place as it rotates within the housing. This tray also includes a filter handle detent for receiving a filter handle attached to the reusable filter. In this way, the reusable filter fits snugly within the tray so that the reusable filter does not become dislodged with use.

BRIEF DESCRIPTION OF THE DRAWINGS

Other objects and features of the present invention will become apparent from the following detailed description considered in connection with the accompanying drawings which disclose one embodiment of the present invention. It should be understood, however, that the drawings are designed for the purpose of illustration only and not as a definition of the limits of the invention.

In the drawings wherein similar reference characters denote similar elements throughout the several views.

DETAILED DESCRIPTION OF THE PREFERRED EMBODIMENT

Figure 1A:
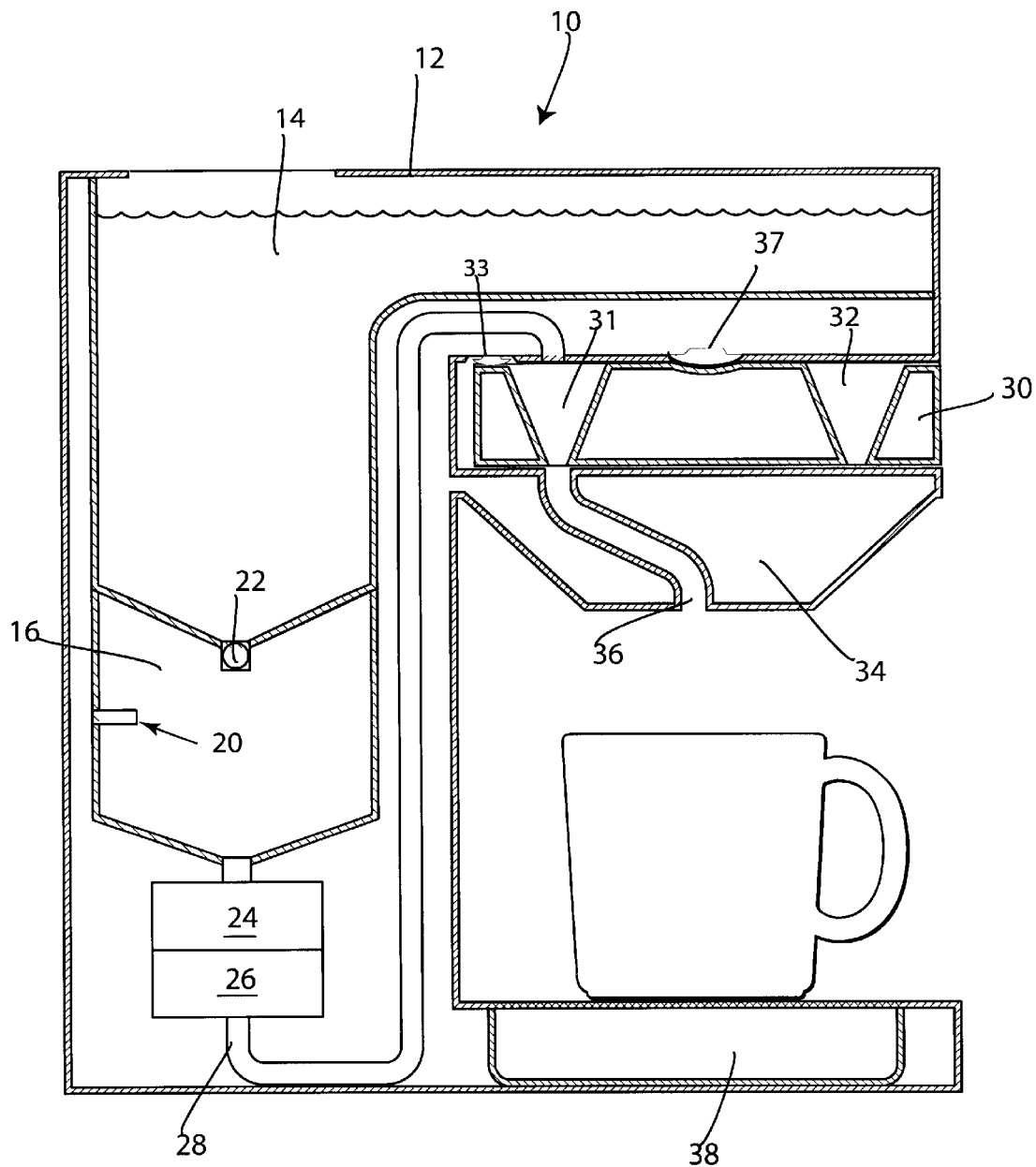
FIG. 1A is a cross-sectional view of the device.
Figure 1B:
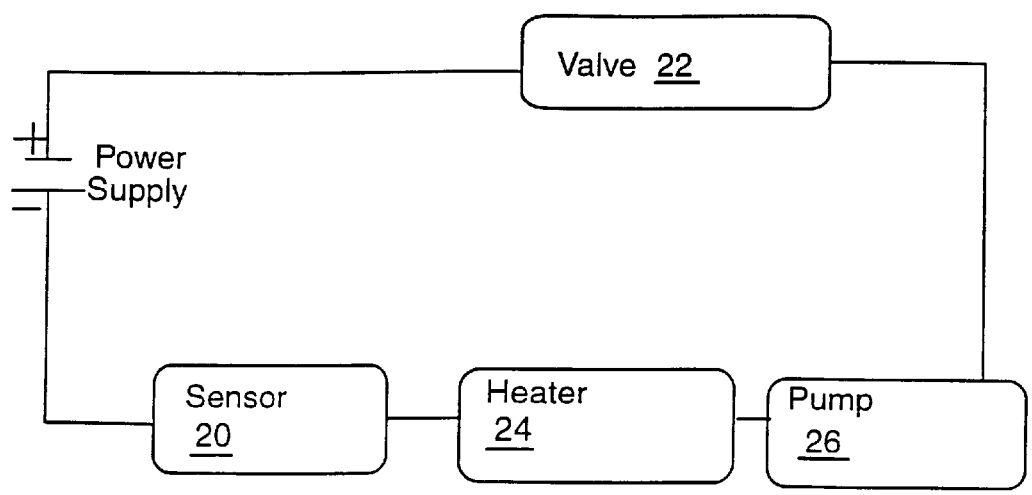
FIG. 1B is a schematic block diagram of the electrical connection within the device.

FIG. 1A refers to a cross-sectional view of the multiple beverage preparation device 10. In addition, FIG. 1B shows a schematic block diagram of the electrical connection between the components. FIG. 1A shows a housing 12, containing a first or primary reservoir 14 and a secondary reservoir 16. Connecting the primary reservoir 14 with the secondary reservoir 16 is a valve that opens and closes based upon the level of liquid housed within the secondary reservoir 16. Disposed within the secondary reservoir is a liquid level sensor 20 that is designed to read the level of the liquid in the secondary reservoir 16. If the level of the liquid is above liquid level sensor 20 then a valve 22 that fluidly connects first reservoir 14 with second reservoir 16 either shuts off to stop the flow of water, or alters its position to reduce the flow of water from first reservoir 14 to second reservoir 16. Once the water or liquid exceeds level of sensor, the valve changes its position so that the amount of water entering into second reservoir 16 does not exceed the amount of water leaving second reservoir 16.

Once the water leaves second reservoir 16, it flows into heater 24 where the water is heated up to a temperature of approximately 150–180 degrees Fahrenheit which is appropriate for brewing coffee or tea. Next, the water flows into a pump 26 which pumps the water through tube 28 to tray 30. Once the water has flowed into tray 30 it next flows into receptacle 31 which contains a concentrate for making a beverage. The concentrate is most likely ground coffee beans which are placed within a filter or strainer 50 (FIG. 3) and used to add flavor to the water being poured into receptacle 31. Once the water flows through receptacle 31 it flows down through chamber 34 and into a coffee cup 37. Coffee cup 37 is heated by a hot plate 38 disposed within housing 12.

Figure 2:
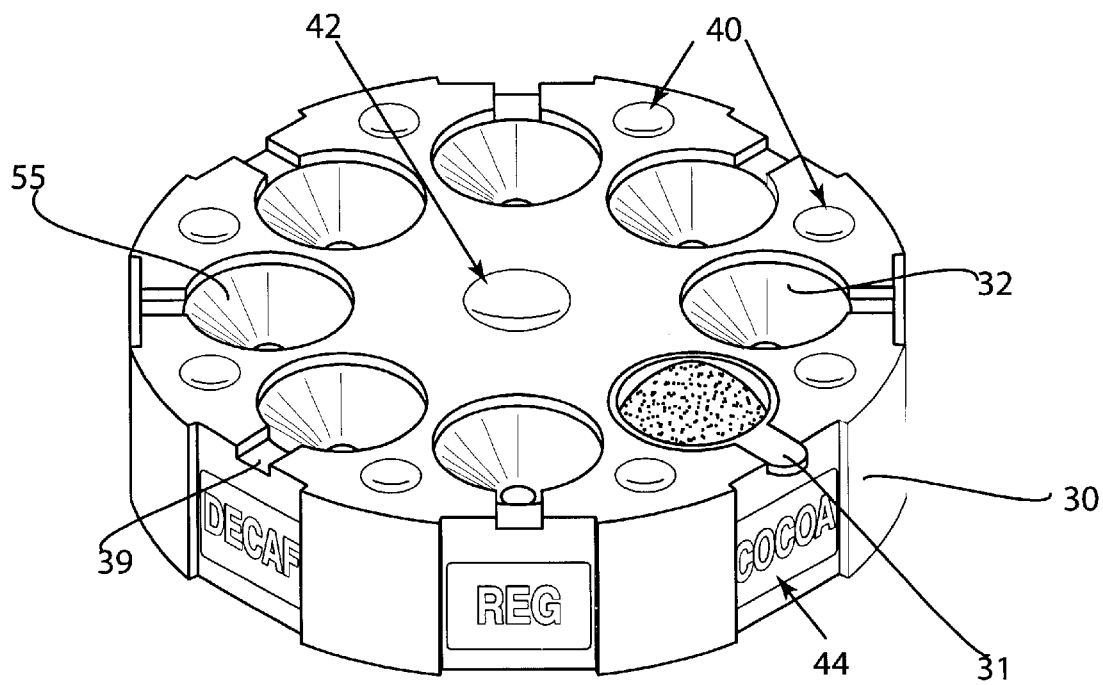
FIG. 2 is a perspective view of the tray.

As shown in FIG. 2 there is a tray 30 that contains a series of receptacles 32. Disposed in one of the receptacles is a plurality of particles that are used to flavor water or any other type beverage that flows through these receptacles and through a strainer 50. Here, the tray 30 contains a series of label plates 44 that are positioned adjacent to each receptacle 32 so that each label plate 44 can be used to mark the type of concentrate that is disposed within each receptacle. In addition, disposed on tray 30 is a series of detents 40 that are used to adjustably stop the rotation of tray 30 as it rotates within housing 10. For example, these detents 40 are mated with a series of spherically shaped adjustably mounted stops 33 shown in FIG. 1A. Thus, when tray 30 rotates, the spherically shaped stops recede into housing 10 as they come into contact with a non detent portion of tray 30. Once tray 30 has rotated into is next position, the spherically shaped stops insert into detents 40. In addition, as shown in tray 30 there is a detent 42 that is used to position tray 30 within a center region of housing 10. In this way, another centrally located spherically shaped stop 37 shown in FIG. 1A is disposed within this center region to control the positioning of tray 30.

Figure 3:
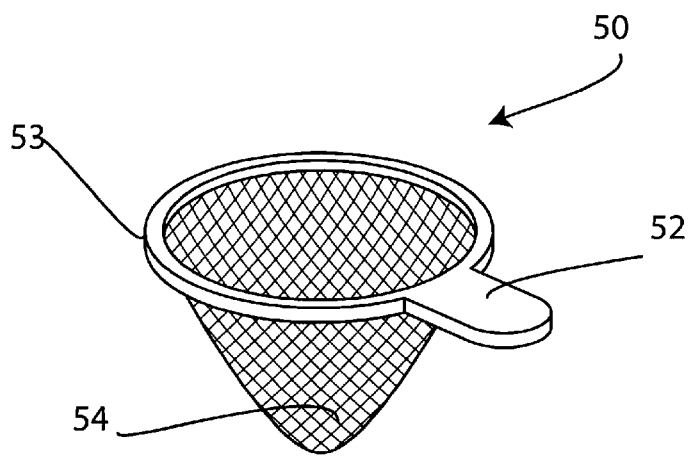
FIG. 3 is a perspective view of the reusable filter.

FIG. 3 shows a strainer 50 that is used to house flavored particles or crystals that are used to flavor water or any other type fluid that flows through housing 10. Strainer 50 contains a handle 52 that fits within tray 30 in a handle receiving portion 39. In addition, strainer 50 also contains a hoop 53 that is made from a solid material that fits within a hoop receiving portion of receptacle 32. Thus, because handle 52 fits within handle receiving portion 39, and hoop 53 fits within hoop receiving portion of receptacle 32, strainer 50 stays substantially still within tray 30.

In this case, once the water passes through strainer 50 and through the flavored particles, the water passes down into a cup shown in FIG. 1A. Essentially, the purpose of this invention is to provide a carousel type dispenser that is used to deliver different types of ground-flavored particles that are used to flavor coffee, tea or any other type beverage. Because there are a series of different receptacles 32 disposed within a rotating tray 30, this design allows a user to make multiple cups of coffee using different flavoring particles without removing rotatable tray 30.

Accordingly, while one embodiment of the present invention has been shown and described, it is to be understood that many changes and modifications may be made thereunto without departing from the spirit and scope of the invention as defined in the appended claims. /

What is claimed is:

1. A device for the preparation of multiple beverages comprising:
   a) a housing containing a primary reservoir for holding a liquid;
   b) a rotatable tray disposed within said housing;
   c) a plurality of receptacles disposed within said rotatable tray, said receptacles for receiving a concentrate solution for flavoring said liquid; and
   d) a conduit for transporting said liquid from said reservoir to said rotatable tray within said housing; and
   e) a plurality of spring loaded protrusion disposed within said housing, said spring loaded protrusion for fixing said rotable tray within said housing.

2. The device as in claim 1, further comprising a heater for heating said liquid within said housing.

3. The device as in claim 1, further comprising at least one additional reservoir disposed within said housing adjacent to said primary reservoir within said housing.

4. The device as in claim 3, further comprising a valve connecting said primary reservoir to said at least one additional reservoir.

5. The device as in claim 4, further comprising a liquid position sensor, and at least one additional housing wherein said liquid position sensor is disposed within said at least one additional housing wherein said liquid position sensor opens said valve when said liquid is below said liquid position sensor and closes said valve when said liquid has either reached or passed said liquid position sensor.

6. The device as in claim 1, further comprising a pump for pumping liquid from said reservoir through said conduit and into said rotatable tray.

7. The device as in claim 1, further comprising a spout disposed within said housing adjacent to said rotatable tray wherein said spout is designed to funnel said liquid into a stream after said liquid has left said rotatable tray.

8. The device as in claim 1 wherein said rotatable tray further comprises a series of label plates wherein there is at least one label plate disposed adjacent to each of said receptacles.

9. The device as in claim 1, wherein said rotatable tray includes a detent disposed in a center region of said rotatable tray so that when said rotatable tray is inserted into said housing, said detent is designed to receive said spring loaded protrusion so that said rotatable tray rotates around said spring loaded protrusion within said housing.

10. The device as in claim 1, wherein said tray further comprises a series of locking detents disposed within said tray wherein said locking detents are designed to mate with said spring loaded detents to periodically lock said rotatable tray as it rotates within said housing.

11. The device as in claim 1, further comprising a spill tray disposed within said housing wherein said spill tray is designed to receive said liquid as it spills out of a cup that fills with said liquid.

12. A device for the preparation of multiple beverages comprising:
   a) a housing containing a primary reservoir for holding a liquid;
   b) a rotatable tray disposed within said housing;
   c) a plurality of receptacles disposed within said rotatable tray, said receptacles for receiving a concentrate solution for flavoring with said liquid; and
   d) a conduit for transporting said liquid from said reservoir to said rotatable tray within said housing; and
   e) a reusable filter for filtering a concentrate within said housing, said reusable filter being insertable into each of said receptacles in said rotatable tray.

13. The device as in claim 12, wherein said reusable filter further comprises a handle.

14. The device as in claim 12, wherein said tray further comprises a filter handle detent for receiving said filter handle.

* * * * *